United States Patent
Fischbach et al.

(10) Patent No.: US 6,313,439 B1
(45) Date of Patent: Nov. 6, 2001

(54) BRAID CUTTER-SEALER IMPLEMENT AND METHOD

(76) Inventors: Fernando Fischbach, 8368 Dinsdale St., Downey, CA (US) 90240; Ross I Stillwagon, 1335 East Rd., La Habra Height, CA (US) 90670

( * ) Notice: Subject to any disclaimer, the term of this patent is extended or adjusted under 35 U.S.C. 154(b) by 433 days.

(21) Appl. No.: 08/753,542

(22) Filed: Nov. 26, 1996

Related U.S. Application Data

(60) Provisional application No. 60/007,801, filed on Nov. 30, 1995.

(51) Int. Cl.$^7$ .................................................. A45D 20/08
(52) U.S. Cl. ........................ 219/223; 219/225; 132/224; 132/201
(58) Field of Search .................................. 219/223, 225, 219/222, 227, 228; 132/224, 269, 201; 606/27–31, 164; 30/140, 254, 179, 289, 287; 7/125, 127, 132

(56) References Cited

U.S. PATENT DOCUMENTS

| | | | |
|---|---|---|---|
| 1,083,386 | * | 1/1914 | Chapman .............................. 30/140 |
| 1,455,696 | * | 5/1923 | Wright ................................ 219/223 |
| 1,465,838 | * | 8/1923 | Caneavri ............................. 219/223 |
| 1,472,561 | * | 10/1923 | Haberkamp .......................... 219/223 |
| 1,526,063 | * | 2/1925 | Griffin et al. ........................ 219/227 |
| 1,719,232 | * | 7/1929 | Meade ................................. 219/225 |
| 1,957,589 | * | 5/1934 | Harvey ................................. 30/179 |
| 2,032,688 | * | 3/1936 | Dart ..................................... 30/140 |
| 2,068,024 | * | 1/1937 | Harvey ................................. 30/179 |
| 2,258,844 | * | 10/1941 | Brown et al. ........................ 219/225 |
| 3,354,478 | * | 11/1967 | Allen ................................... 219/227 |
| 4,702,246 | * | 10/1987 | Ellis et al. ............................. 606/31 |
| 4,982,748 | * | 1/1991 | Trimarchi ............................ 219/225 |
| 5,046,251 | * | 9/1991 | Scott .................................... 30/140 |
| 5,081,769 | * | 1/1992 | Juros ................................... 30/254 |
| 5,309,640 | * | 5/1994 | Caron ................................... 30/140 |
| 5,472,654 | * | 12/1995 | Crawford ............................. 219/223 |
| 5,769,100 | * | 6/1998 | Alexander ........................... 219/225 |

FOREIGN PATENT DOCUMENTS

| | | | |
|---|---|---|---|
| 2407797 | * | 7/1979 | (FR) . |
| 2532878 | * | 3/1984 | (FR) . |
| 9614767 | * | 5/1996 | (WO) . |

* cited by examiner

Primary Examiner—John A. Jeffery
(74) Attorney, Agent, or Firm—R. Juniper, Atty

(57) ABSTRACT

An implement and method to cut and seal the end of synthetic hair braids by melting and fusing together the hair strands of the braid includes two opposing blades with small flat edges which touch each other and are intended to hold a braid to be cut and sealed between them. Heat is applied to the place the braid is held by the implement which may be by an external stove, attached heating elements or internal heating means which can be electrically powered.

8 Claims, 2 Drawing Sheets

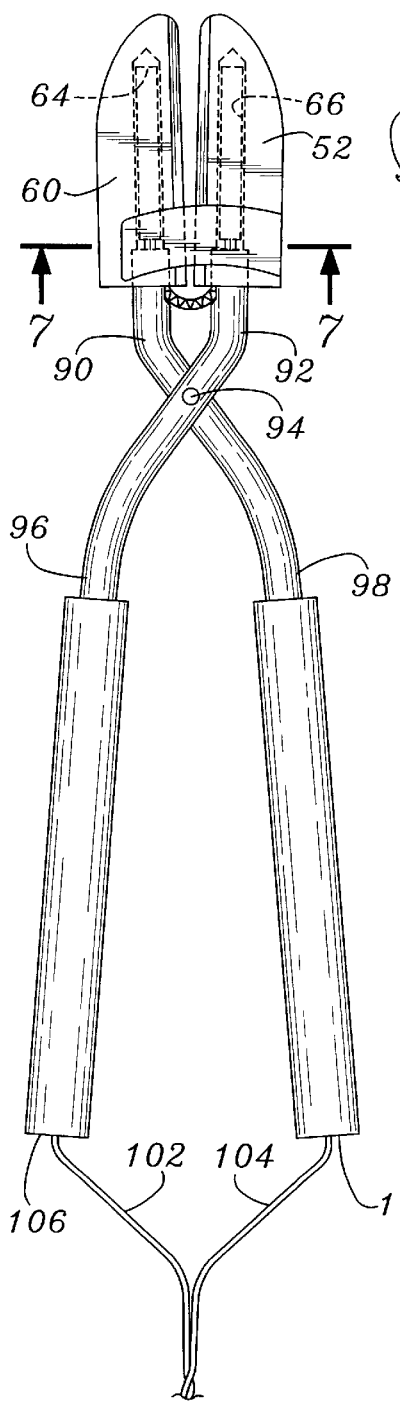
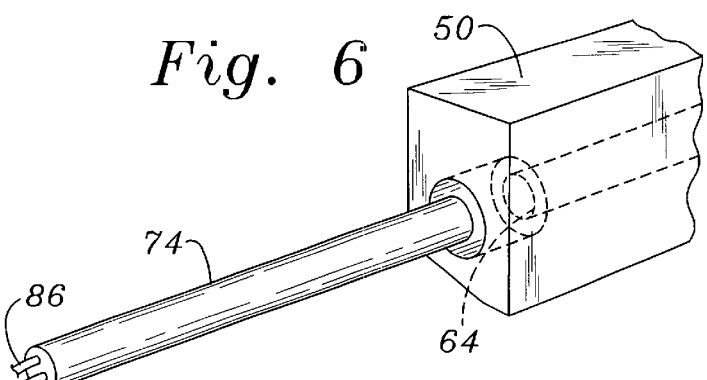
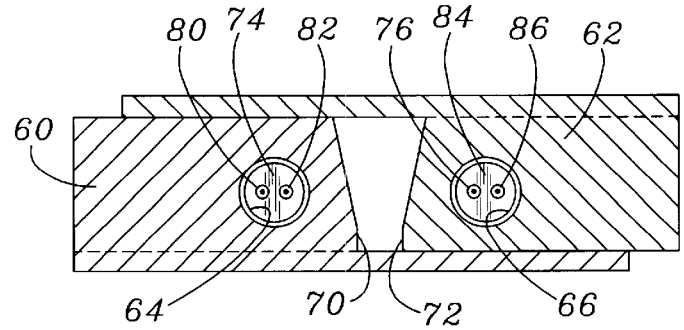
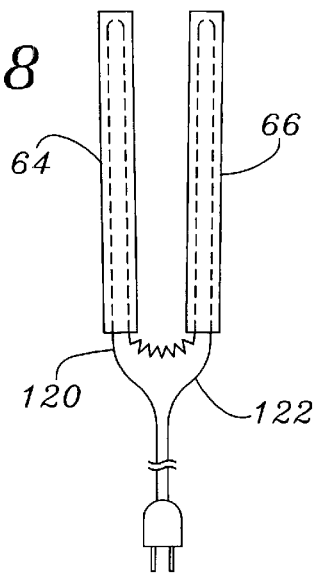

BRAID CUTTER-SEALER IMPLEMENT AND METHOD

This application is based on Provisional Patent Application No. 60/007,801 filed Nov. 30, 1995 the contents of which are incorporated by reference in this application and claimed as this invention to the extent consistent with the specification herein.

BACKGROUND OF THE INVENTION

When synthetic hair is braided, the ends of the braid have a tendency to fray, just like the end of a rope. To keep the ends of synthetic braids from fraying, hair braiders use some type of a heating device, typically a cigarette lighter, matches or a candle, to seal the ends. The "Braid Cutter-Sealer" shown provides a greater degree of safety than an open flame as it is used in a beauty salon, and it also works faster by cutting and sealing the braid in one operation.

THE PRIOR ART

PLIER-type wire-cutters with opposing side-cutting edges appear superficially similar to this invention implement.

However they use sharp edges as cutting means which is Fundamentally distinctive from what is required by this invention which uses flattened edges which are heated to cut and seal braids by melting them.

SUMMARY OF THE INVENTION

The "Braid Cutter-Sealer" is a device designed to cut and at the same time heat seal the ends of synthetic hair braids by melting and fusing together the multiple hair strands that compose the braid. The device consists of 2 blades with small, flat edges facing each other, which touch each other when closed, therefore cutting the braids It is important that these edges NOT be sharp, as they would have a tendency to wear, and the two blades would have a tendency to overlap each other. There is an inclined surface adjacent to the small edges. These inclined surfaces help to seal the entire end of the braid by heating the synthetic braid strands not sealed by the small flat edges during the cutting action. The inclined surfaces face towards the root of the hair when the device is used. The point of the blade is curved towards the tip, which reduces the possibility of the blade burning the scalp when utilizing it to cut and seal short braids. The two blades are maintained in perfect alignment by the 2 curved guides on the side of one blade. The blades are connected to a scissor-like mechanism that allows them to open and close. This mechanism has insulated rotating handles which prevent the operator from burning his/her hands when using. The unit can be heated in suitable stove, or heated by a small electrical heating element, which can be easily attached to one or both blades of the Braid Cutter-Sealer.

DESCRIPTION OF THE DRAWINGS

FIG. 5 is an implement in accordance with this invention as shown in FIG. 1, but which is hollow so as to accomadate internal electrical heating units, shown by dotted lines next to the blade edges, and connected wiring extending out of the handles to a suitable power source(not shown).

FIG. 6 is an isometric fragmented view of a cylindrical heating unit insertable into an end of a blade so as to fit within a mating hollow receptacle therein.

FIG. 7 is a sectional view taken through 7—7 of FIG. 5 showing heating units and associated wiring.

FIG. 8 is a fragmented plan view of electrical heating wiring inserted within hollow receptacle portions of the blades near enough to the flattened edges that enough heat can be transmitted to braids held in the blade edges that the braids can be severed and sealed by melting caused by such heating.

DETAILED DESCRIPTION OF PREFERRED EMBODIMENTS OF THE INVENTION

Figure 1:
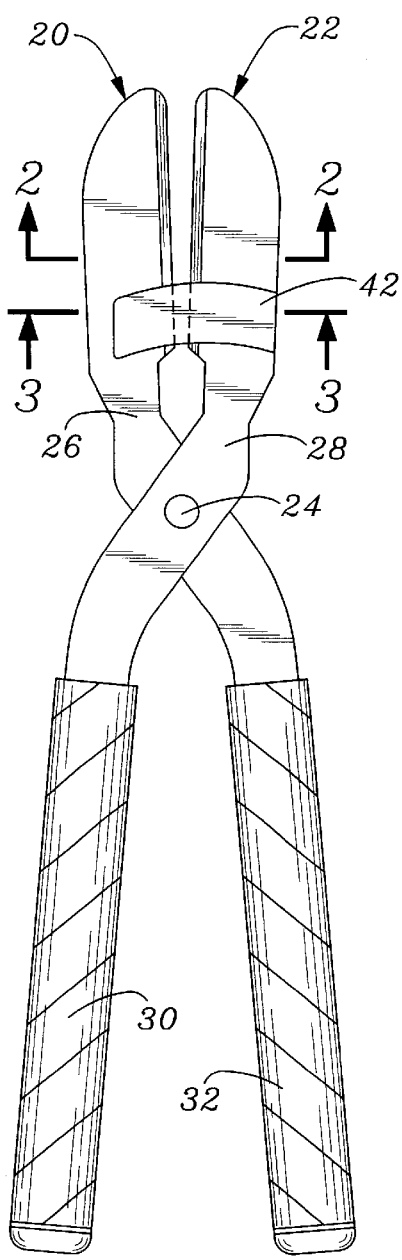
FIG. 1 is a plan view of an example of a braid sealer implement in accordance with this invention, showing two pivotally connected blades having mating flat surfaces that can be compressed together around a braid by squeezing the connected handles.
Figure 2:
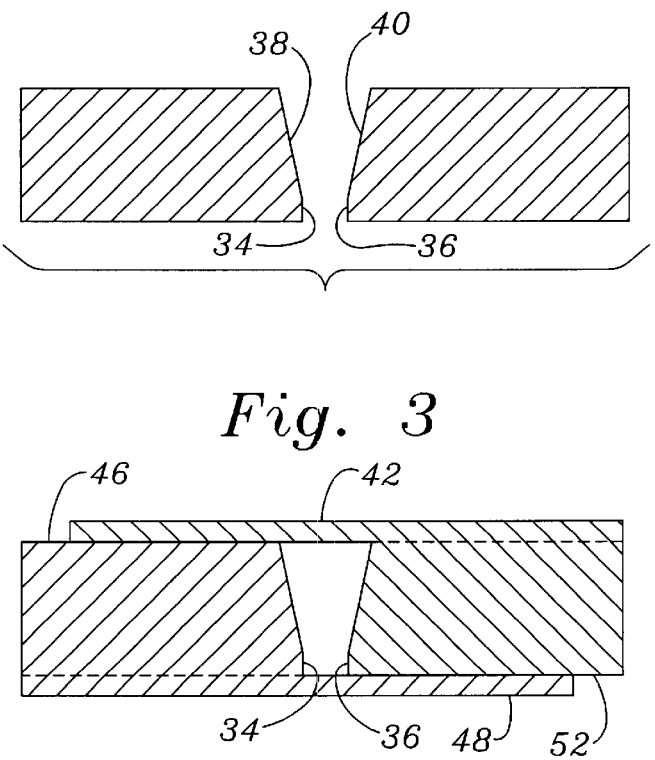
FIG. 2 is a cross-sectional view through the blades of the implement shown in FIG. 1, taken in the plane of 2—2, wherein the flat mating, cutting and sealing edges are shown at the bottom with adjacent tapered surfaces extending upwardly therefrom.
Figure 3:
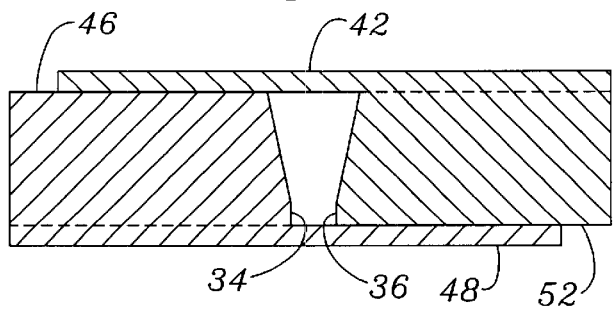
FIG. 3 is a cross-sectional view taken through 3—3 in FIG. 1 showing guide members extending over both the top and bottom of the blade surfaces to hold them precisely in alignment during use.

Shown in the drawings are examples of implements which maximize utilization of this invention as a special means to cut and seal synthetic braids.

This implement includes a pair of elongated blades 20 and 22, made of heat-conductive material, which are positioned by means of a common engaged pivot pin 24, passing through a common extended crossing blade, with extensions 26 and 28, so as to be movable relative to each other.

The movements of the blades 20 and 22, relative to each other, are controlled by handles 30 and 32 which are, respectively, extended, hand gripable, extensions of blades 20 and 22.

The blades 20 and 22 are aligned so that their opposing inner edges 34 and 36 are capable of touching and tightly pressing against each other when moved toward each other.

These inner edges 34 and 36 are flattened relative to each other on the surfaces where they touch. Adjacent to these flattened inner edges 34 and 36 are outwardly sloping edge portions 38 and 40.

In order to keep the blades 20 and 22 precisely aligned relative to each other when moved, an alignment plate 42 is attached to the top 44 of blade 22 so as to extend horizontally out and closely slide over the top 46 of blade 20. In a like manner another alignment plate 48 is attached to the bottom of blade 20 and extends out horizontally to slide under the bottom 52 of blade 22.

The handles 30 and 32 are preferably provided with insulated, axially rotatable, elongated, cylindrical covers, to facilitate control and hand-holding of the implement.

Figure 4:
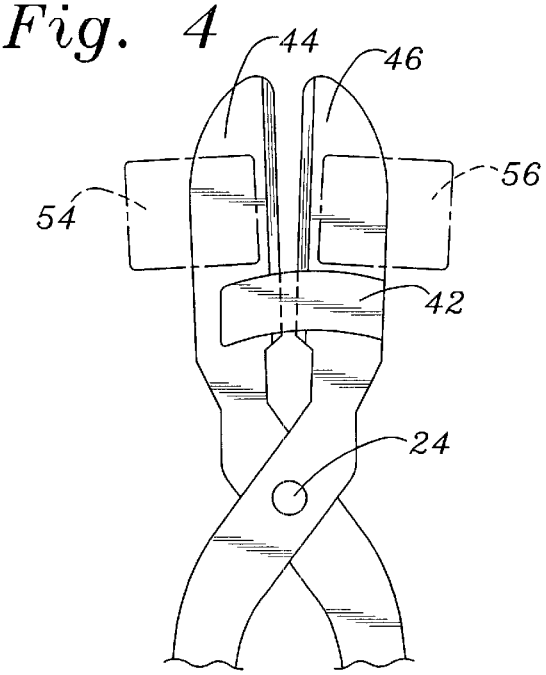
FIG. 4 is a fragmented plan view of blades in accordance with this invention having external heating units shown as the dotted line box structures.

As shown in FIG. 4 heating elements 54 and 56,(shown with dotted lines) can be attached, respectively, to each of the blades 20 and 22 so that their heat-conductive portions, 44 and 46, are near enough, and have enough heat capacity, to cause the inner edges 34 and 36 to melt, cut and seal engaged braids in accordance with this invention.

FIG. 5 is a modification of this invention which uses electrical means as the heating elements. Thus, in the example shown, blades 60 and 62 are provided with internal elongated cavities 64 and 66, as shown in section, by FIG. 7.

These cavities 64 and 66 are axially aligned as near as practical to the flattened edges, 70 and 72, of blades 60 and 62, in order to maximize the heat-conductive efficiency where engaged braids are to be melted,cut and sealed.

Fitted within the cavities 64 and 66 are mating heating elements 74 and 76, which are provided with suitable electrical wires, 80, 82 and 84, 86, which cause the elements to heat up to predetermined temperatures. In order to provide electrical power for these wires the adjacent interconnected portions of blade-handle extensions 90 and 92 (connected for pivotal movement through a common pivot pin 94) and handles 96 and 98 are hollow.

The electrical wiring, 102 and 104, carrying wires 80, 82 and 84, 86 extends out of the hollow handle ends 106 and 108, for emotive interconnection to a suitable power source, not shown.

The amount of heat provided is predetermined to be sufficient to be transmitted through the surrounding heat-conductive material in the respective blades, 60 and 62, so that enough is received on the inner edges, 70 and 72, to cause an engaged braid to be melted, so as to be cut and sealed.

As shown in FIG. 8 electrical heating wiring 120 and 122 can be inserted directly into the cavities 64 and 66 in the blades 50 and 52, respectively, to serve as suitable heating means for the heat-conductive material of the blade edges.

In order to facilitate sealing of heated braids the angle of the sloping edge portions 38 and 40 relative to the flattened edge portions 34 and 36 is preferably inclined outwardly about eleven degrees.

These sloping edge portions 38 and 40 help to seal the entire end of the braid by heating the braid strands not sealed by the flat edges 34 and 36 during the cutting by melting action. In use the sloping edge portions are faced toward the roots of the hairs. The points of the blades 20A and 22A are curved toward the tips in order to reduce the possibility of the blade burning the scalp when used to cut and seal short braids.

Though particular examples have been shown and described herein these are meant not as limitations of this invention, but exemplicative embodiments only. Rather, the invention is intended to comprehend all forms and variations and modifications within the spirit of the following appended claims.

What is claimed is:

1. An implement for cutting and fusing synthetic, hair-like braids including:

first and second blade members which each have narrow, non-shearing flattened edges;

means to press only said flattened edges of said first and second members to close together flatly so as to press and hold hair-like braids between them;

and heating means capable of heating said flattened edges of said members, at the places where braids are held with sufficiently high heat that held braids are melted, cut and fused by said heat.

2. An implement as defined in claim 1 wherein said first and second members are pivotally connected to align said flattend edges.

3. An implement as defined in claim 2 wherein guide means plates are connected to slide over and touch said first and second members to assure alignment of their flattened edges when closed together.

4. An implement as defined in claim 3 wherein said heating means are inserted within said members adjacent to said flattened edges.

5. An implement as defined in claim 3 wherein said heating means is electrically energized.

6. An implement as defined by claim 2 wherein said heating means is attached to said first and second members so as to heat their flattened edges.

7. An implement as defined in claim 2 wherein the adjacent surfaces near said flattened edges of said first and second members are tapered away from said flattened edges enough to heat-seal frayed braid.

8. An implement as defined in claim 7 wherein the angle at which said surfaces adjacent to said flattened edges tapers is about eleven degrees.

* * * * *